United States Patent
Nakamura

(10) Patent No.: US 10,696,804 B2
(45) Date of Patent: Jun. 30, 2020

(54) CARBON FIBER COMPOSITE MATERIAL

(71) Applicant: SEKISUI CHEMICAL CO., LTD., Osaka (JP)

(72) Inventor: Masanori Nakamura, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 108 days.

(21) Appl. No.: 15/352,733

(22) Filed: Nov. 16, 2016

(65) Prior Publication Data

US 2017/0066887 A1    Mar. 9, 2017

Related U.S. Application Data

(63) Continuation of application No. 14/237,955, filed as application No. PCT/JP2012/070916 on Aug. 17, 2012.

(30) Foreign Application Priority Data

Aug. 19, 2011   (JP) .................................. 2011-179628

(51) Int. Cl.
*C08J 5/04*      (2006.01)
*C08J 5/06*      (2006.01)
*D06M 11/74*     (2006.01)
*D06M 15/37*     (2006.01)
*D06M 13/355*    (2006.01)
*D06M 10/04*     (2006.01)
(Continued)

(52) U.S. Cl.
CPC .................. *C08J 5/042* (2013.01); *C08J 5/06* (2013.01); *D06M 10/04* (2013.01); *D06M 11/74* (2013.01); *D06M 13/355* (2013.01); *D06M 15/227* (2013.01); *D06M 15/37* (2013.01); *C08J 2323/12* (2013.01); *D06M 2101/40* (2013.01); *Y10T 442/2098* (2015.04)

(58) Field of Classification Search
CPC ....................................................... C08J 5/042
See application file for complete search history.

(56) References Cited

U.S. PATENT DOCUMENTS 3,853,610 A * 12/1974 Byrne ..................... B29C 70/04
                                                    264/29.2
3,908,061 A    9/1975 Byrne et al.
(Continued)

FOREIGN PATENT DOCUMENTS

JP         10-60779      3/1998
JP         2001-19546    1/2001
(Continued)

OTHER PUBLICATIONS

Shen et al., "Processing and characterization of carbon fibre-reinforced polynaphthoxazine composite," 1996, J. Mater. Sci. 31, pp. 5945-5952. (Year: 1996).*

(Continued)

*Primary Examiner* — Robert A Vetere
(74) *Attorney, Agent, or Firm* — Wenderoth, Lind & Ponack, L.L.P.

(57) ABSTRACT

The present invention relates to a carbon fiber composite material containing carbon fibers coated with amorphous carbon, and a matrix resin.

According to the present invention, a high-strength carbon fiber composite material can be provided.

7 Claims, 4 Drawing Sheets

(51) Int. Cl.
   *D06M 15/227* (2006.01)
   *D06M 101/40* (2006.01)

(56) References Cited

U.S. PATENT DOCUMENTS

| | | | |
|---|---|---|---|
| 4,215,161 | A | 7/1980 | Seibold et al. |
| 5,152,939 | A | 10/1992 | Ishida |
| 5,393,822 | A * | 2/1995 | Marumoto ................. C08J 5/06 523/206 |
| 5,641,572 | A | 6/1997 | Yoshimura et al. |
| 2001/0025065 | A1* | 9/2001 | Matsumora ............. C08K 3/08 523/215 |
| 2002/0033299 | A1* | 3/2002 | Thomas .................... B60G 3/18 180/377 |
| 2004/0041128 | A1* | 3/2004 | Carter ........................ C08J 3/24 252/500 |
| 2005/0053787 | A1* | 3/2005 | Yamasaki ............. B29C 70/00 428/411.1 |
| 2007/0275285 | A1* | 11/2007 | Choi ...................... H01B 1/122 429/492 |
| 2010/0137502 | A1 | 6/2010 | Watanabe et al. |
| 2010/0151253 | A1* | 6/2010 | Roth ...................... C09D 5/086 428/413 |
| 2011/0143110 | A1* | 6/2011 | Tsuchiya .................... C08J 5/24 428/213 |
| 2012/0091056 | A1* | 4/2012 | Satoh .................. B01D 63/066 210/490 |
| 2014/0166929 | A1* | 6/2014 | Takeuchi ............. H01M 4/625 252/182.1 |

FOREIGN PATENT DOCUMENTS

| | | |
|---|---|---|
| JP | 2003-249239 | 9/2003 |
| JP | 2004-288460 | 10/2004 |
| JP | 2005-133035 | 5/2005 |
| JP | 2005-133062 | 5/2005 |
| JP | 2005-225712 | 8/2005 |
| JP | 2011-68829 | 4/2011 |

OTHER PUBLICATIONS

International Search Report dated Nov. 13, 2012 in International (PCT) Application No. PCT/JP2012/070916.
Extended European Search Report dated Mar. 17, 2015 corresponding European Application No. 12825966.0.
Shen et al., "Processing and characterization of carbon fibre-reinforced polynaphthoxazine composite", 1996, Journal of Materials Science, vol. 31, pp. 5945-5952.

* cited by examiner

CARBON FIBER COMPOSITE MATERIAL

TECHNICAL FIELD

The present invention relates to a carbon fiber composite material having high-strength. Priority is claimed on Japanese Patent Application No. 2011-179628, filed on Aug. 19, 2011, and the content of which is incorporated herein by reference.

BACKGROUND ART

Carbon fiber composite materials in which matrix resins such as thermoset resins, thermoplastic resins and the like are reinforced with carbon fibers have excellent modulus of tensile elasticity and tensile strength, and thus they have been utilized in sports, leisure, aerospace, and in addition, in blades for wind power generation and the like.

Mechanical characteristics, such as strength, modulus of elasticity and the like of carbon fiber composite materials are largely affected with affinity and adhesive strength between carbon fibers and matrix resins. Accordingly, oxidation treatments such as introductions of functional oxygen groups onto surfaces of carbon fibers are usually performed. As oxidation treatments, chemical oxidation, electrolytic oxidation, gas phase oxidation and the like in liquid phases have been known.

However, when a matrix resin is a resin of low-polarity, such as polypropylene, an oxidation treatment on surfaces of carbon fibers does not sufficiently increase adhesive strength, and thus polypropylene should also be treated with maleic acid graft and the like, which results in a higher cost.

On the other hand, in addition to an oxidation treatment on surfaces of carbon fibers, it has been attempted to further coat the surface of the carbon fibers with a resin. For example, Patent Document 1 discloses the example to improve adhesiveness of carbon fibers to an unsaturated polyester resin by using a surface treatment agent for carbon fibers, which consists of an epoxy resin; an alkylene oxide adduct of monocyclic or polycyclic phenols; and a polyester condensate of an unsaturated dibasic acid or an ester forming derivative thereof and an alkylene oxide adduct of vinylphenols.

CITATION LIST

Patent Document

[Patent Document 1]
Japanese Unexamined Patent Application, First Publication No. H10-60779.

SUMMARY OF INVENTION

Technical Problem

However, the surface treatment agent for carbon fibers described in Patent Document 1 does not sufficiently improve adhesiveness of a polypropylene resin, which has an extremely low-polarity.

In light of such a situation, the aim of the present invention is to provide a carbon fiber composite material having good adhesiveness between a matrix resin and carbon fibers, which results in high-strength, even if a matrix resin having difficulties on adhesion, such as a polypropylene resin is used.

Solution to Problem

The present inventors have found that, surfaces of carbon fibers coated with amorphous carbon in advance is useful to enhance adhesiveness to a matrix resin, particularly adhesiveness to a polypropylene resin, which has been known to be difficult to adhere, and have developed the following structures. That is, the present invention provides a carbon fiber composite material having the following structures.

(1) A carbon fiber composite material containing carbon fibers coated with amorphous carbon, and a matrix resin.

(2) The carbon fiber composite material described in (1), in which the amorphous carbon has peaks around 1580 $cm^{-1}$ and 1360 $cm^{-1}$ in the Raman spectrum.

(3) The carbon fiber composite material described in (1) or (2), in which the matrix resin is polypropylene.

(4) The carbon fiber composite material described in any one of (1)-(3), in which the amorphous carbon is derived from a phenol resin.

(5) The carbon fiber composite material described in (4), in which the amorphous carbon is derived from an oxazine resin.

(6) The carbon fiber composite material described in (5), in which the amorphous carbon is derived from a naphthoxazine resin.

(7) A method for manufacturing the carbon fiber composite material described in any one of (1)-(6), including the steps of manufacturing a carbon fiber woven cloth coated with amorphous carbon by dipping carbon fibers in a solution, in which a phenol resin is dissolved in a solvent, to allow the carbon fibers are impregnated with the resin solution, or by spraying a resin solution to the surfaces of carbon fibers, drying the resin solution by heating, and heating at a high temperature to carbonize the resin; injection molding a molten matrix resin into a film-shape; and laminating, compressing, and then cooling the carbon fiber woven cloth coated with the amorphous carbon and the matrix resin sheet injection molded into the film-shape.

Advantageous Effects of Invention

In the carbon fiber composite material of the present invention, surfaces of carbon fibers coated with amorphous carbon strongly adhere to a matrix resin that is difficult to be adhered, such as polypropylene, and for the resulting high-strength, the carbon fiber composite material can be applied to various uses.

DESCRIPTION OF EMBODIMENTS

The carbon fiber composite material of the present invention contains carbon fibers coated with amorphous carbon, and a matrix resin.

(Carbon Fiber)

In the present invention, carbon fibers coated with amorphous carbon are not particularly limited, and both PAN and PITCH can be used. Also, the present invention can be applied to any shapes. For example, diameters of fibers to be used are usually from 4 to 20 μm. Regarding cut lengths of fibers, milled fibers which are shortly cut to 2 mm or less, chopped strand shapes having lengths of 3 to 30 mm, and continuous fibers can also be used. Regarding filaments of continuous fibers, the assembled number of fibers is usually from 500 to 30,000, and carbon fiber cloths in which filaments are woven vertically and horizontally can also be used. According to the present invention, surfaces of these carbon fibers are coated in advance.

In the present invention, amorphous carbon for coating of carbon fibers is not particularly limited, provided that it has an amorphous structure, and consists of carbon.

A method for coating surfaces of carbon fibers with amorphous carbon is not particularly limited, and a variety of methods can be taken into consideration. Specifically, an example is a method in which dipping carbon fibers in a solution, in which a resin is dissolved in a suitable solvent, to allow the carbon fibers are impregnated with the resin solution, or by spraying a resin solution to surfaces of carbon fibers, drying the resin solution by heating, and heating at a high temperature to carbonize the resin. In this case, the carbonized resin is amorphous, and can be referred to as amorphous carbon.

Figure 1:
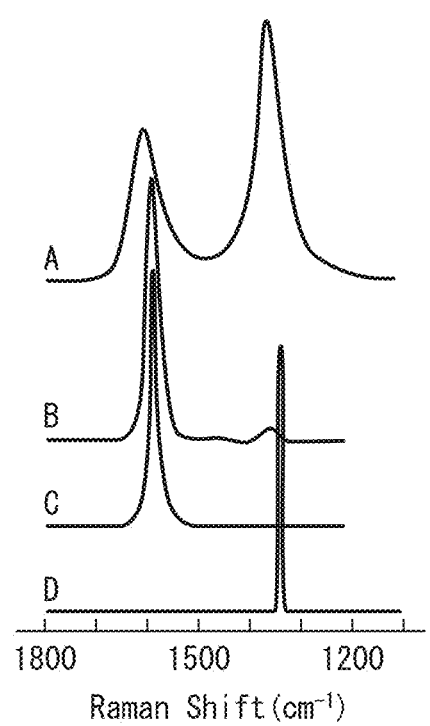
FIG. 1 shows Raman spectrographs of (A) amorphous carbon, (B) pyrolytic graphite, (C) highly-oriented pyrolytic graphite, and (D) diamond.

Generally, a material referred to as carbon is amorphous, and a determination thereof can be done easily by using the Raman spectrum. The Raman spectra of carbon materials generally show two large peaks. Each of them is referred to as G band (around 1580 cm$^{-1}$) and D band (around 1360 cm$^{-1}$) respectively (see FIG. 1). As shown in (C) highly-oriented pyrolytic graphite of FIG. 1, when a carbon material is crystalline, D band among the aforementioned two bands is minimized. That is, when the two peaks of G band and D band are clearly recognized as (A) of FIG. 1, it can be determined as amorphous carbon.

Generally, resins can be carbonized by heating at a high temperature; however, heat treatments at high temperatures of 300° C. or above result in high costs, and thus resins used for coating of surfaces of carbon fibers with amorphous carbon are preferably be carbonized at temperatures as low as possible, and phenol resins are particularly preferable.

Phenol resins are one of thermoset resins, which can be obtained by reacting phenols with formaldehyde, and are particularly easy to be carbonized.

Among phenol resins, an oxazine resin is more preferable because it can be easily carbonized at low temperatures. Although the resin referred to herein as an oxazine resin is generally classified into phenol resins, it is a thermoset resin that can be obtained by reacting phenols with formaldehyde, as well as with amines. Note that when a certain type of phenols in which a phenol ring further has an amino group, for example, paraaminophenol, is used, amines are not required in the above reaction, and also carbonization tends to occur easily. As will be mentioned below, carbonization more easily occurs by using naphthalene rings instead of benzene rings.

Oxazine resins include a benzoxazine resin and a naphthoxazine resin. Among them, a naphthoxazine resin is preferable because it tends to be carbonized at the lowest temperature. As a part of the structure of the oxazine resin, the following Formula (1) shows a partial structure of the benzoxazine resin, and Formula (2) shows a partial structure of the naphthoxazine resin.

As stated, the oxazine resin is referred to as a resin having 6-membered rings attached to a benzene ring or a naphthalene ring, and the 6-membered rings contain oxygen and nitrogen, which are the origin of the name.

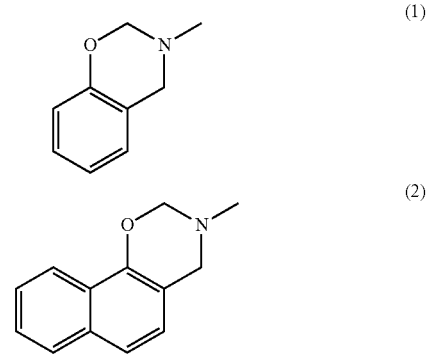

By using an oxazine resin, films of amorphous carbon can be obtained at considerably low temperatures compared to other resins such as an epoxy resin. Carbonization can be performed specifically at temperatures of 200° C. or below.

Oxazine resins include a benzoxazine resin and a naphthoxazine resin. Hereinafter, a naphthoxazine resin that is more easily carbonized will be explained.

Dihydroxynaphthalene as phenols, formaldehyde, and amines are used as raw materials of a naphthoxazine resin.

There are many isomers of dihydroxynaphthalene, and examples include 1,3-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene.

Among them, 1,5-dihydroxynaphthalene and 2,6-dihydroxynaphthalene are preferable for their high-reactivities. Since 1,5-dihydroxynaphthalene has the highest reactivity, this is more preferable.

Since formaldehyde is unstable, formalin, which is a formaldehyde solution, is preferably used. In addition to formaldehyde and water, formalin usually contains a small amount of methanol as a stabilizer. In the present invention, formalin can be used as formaldehyde, provided that formaldehyde content thereof is clearly known.

Paraformaldehyde, which is a polymerized form of formaldehyde, can also be used as a raw material; however, its reactivity is lower, and the aforementioned formalin is preferable.

As amines, aliphatic amines are particularly preferably used.

The general formula of aliphatic amines is represented by R—NH$_2$, in which R is preferably an alkyl group of 5 or less carbon atoms. Examples of an alkyl group of 5 or less carbon atoms include a methyl group, an ethyl group, an n-propyl group, an isopropyl group, a cyclopropyl group, an n-butyl group, an isobutyl group, an s-butyl group, a t-butyl group, a cyclobutyl group, a cyclopropylmethyl group, an n-pentyl group, a cyclopentyl group, a cyclopropylethyl group, and a cyclobutylmethyl group, but not limited thereto.

Since smaller molecular weights are preferable, the substituent R is preferably a methyl group, an ethyl group, a propyl group or the like, and methylamine, ethylamine, propyl amine or the like is preferably used as an actual compound. Methylamine is most preferable for its smallest molecular weight.

Regarding a ratio between three components: dihydroxynaphthalene, an aliphatic amine, and formaldehyde, most preferably 1 mole of dihydroxynaphthalene, 1 mole of an aliphatic amine, and 2 moles of formaldehyde are mixed.

In some reaction conditions, since raw materials may be lost by volatilization or the like during reactions, the most preferable mixing ratio is not limited to the ratio of above; however, preferable mixing ratios are within the range of 1 mole of dihydroxynaphthalene, 0.8 to 1.2 moles of an aliphatic amine, and 1.6 to 2.4 moles of formaldehyde.

When an aliphatic amine is 0.8 moles or more, an oxazine ring can sufficiently be formed, and thus polymerization preferably proceeds. Also, when an aliphatic amine is 1.2 moles or less, formaldehyde required for a reaction is not consumed too much, and thus the reaction favorably proceeds to obtain desired naphthoxazine. Similarly, when formaldehyde is 1.6 moles or more, an oxazine ring can sufficiently be formed, and thus polymerization preferably proceeds.

Also, 2.4 moles or less of formaldehyde is preferable to reduce side reactions.

When these three components are used as raw materials, a solvent to dissolve these raw materials to react can be used.

Any solvent can be applied if the raw materials can be dissolved therein. Examples of the solvent include conventional solvents for dissolving resins, such as tetrahydrofuran, dioxane, dimethylformamide, dimethylacetamide, dimethyl sulfoxide, N-methylpyrrolidone and the like.

An adding ratio of solvent is not particularly limited; however, when raw materials including dihydroxynaphthalene, an aliphatic amine, and formaldehyde are 100 parts by mass, it is usually preferable to mix a solvent within a range from 100 to 3000 parts by mass. When a solvent is 100 parts by mass or more, a solute can sufficiently be dissolved to form a uniform film, and when it is 5000 parts by mass or less, a concentration required for a surface treatment can be kept.

A naphthoxazine resin can be manufactured by dissolving the above-described raw materials in a solvent to make a solution, and then proceeding a reaction.

Although the reaction proceeds at normal temperatures, warming to 50° C. or above is preferable to shorten a reaction time. When it is continuously warmed, a produced oxazine ring is opened and polymerized to increase a molecular weight, and thereby a polynaphthoxazine resin is produced. Note that if the reaction proceeds further, a viscosity of the solution is increased, and it will not be suitable for coating.

A method for coating carbon fibers by using the naphthoxazine resin solution produced as described above will be explained.

A method for coating is also not particularly limited, and a resin can be evenly coated on surfaces of carbon fibers by spraying the resin solution of after the above-described reaction to surfaces of carbon fibers, or impregnating carbon fibers with the resin solution, and then removing the excess solution by pinching with a rotating roll or the like.

In addition, after coating, a resin can be evenly coated on surfaces of carbon fibers by drying and removing the solvent with hot air or the like. A drying method by heating is also not particularly limited.

A thickness of a resin to coat surfaces of carbon fibers is not particularly limited, and can be determined depending on kinds of carbon fibers and resins, and kinds of matrix resins and the like. The easiest way to control a thickness of a resin for coating is changing a resin concentration in a solution. As mentioned above, when a solvent is 100 parts by mass or more for 100 parts by mass of raw materials, sufficient solubility to a solvent and film formability can be obtained, and when it is 5000 parts by mass or less, a concentration required for a surface treatment can be kept.

A method for carbonizing a coated resin to make it amorphous carbon is not particularly limited, and a resin can be carbonized by a conventional method with a heating oven or the like.

Among them, when a phenol resin, which can be carbonized at low temperatures, is used, amorphous carbon can be produced by heating at a temperature of 300° C. or below with a heating oven or the like.

In addition, when an oxazine resin that can be carbonized at low temperatures (particularly a naphthoxazine resin, which can be carbonized at especially low temperatures), is used, it can be carbonized even at a temperature of 200° C. or below.

As mentioned, when carbonization is performed at low temperatures, an inert gas such as nitrogen does not need to be used for heating, and thus easy and preferable.

In the method described above, carbon fibers whose surfaces are coated with amorphous carbon can be obtained by carbonization.

(Matrix Resin)

In the present invention, a matrix resin is not particularly limited; however, by coating carbon fibers with amorphous carbon in the present invention, the carbon fibers can be applied to a resin of low-polarity, which is deemed to have low-adhesiveness to carbon fibers, and thus a resin of low-polarity is preferably used as a matrix resin, and polypropylene is particularly preferably used.

Polypropylene is a thermoplastic resin produced by polymerizing propylene, and is classified as isotactic, syndiotactic, atactic and the like by differences of tacticity. In the present invention, mainly, isotactic is preferably used from a point of view of mechanical properties.

Also, polypropylene can include other units, as long as the polypropylene includes a portion in which propylene units are polymerized. For example, random polymers and block polymers, which contain a small amount of ethylene, 1-butene and the like as components, can also be used.

From a point of view of impregnation of a carbon resin, the MFR (melt flow rate), which reflects a molecular weight, is preferably higher. Therefore, polypropylene is preferably selected from polypropylene of an injection grade available from various companies.

A method for manufacturing a carbon fiber composite material is not particularly limited, and conventional methods can be employed. For example, a carbon fiber woven cloth can be impregnated with a molten matrix resin by injection molding a molten matrix resin into a film-shape by using a sheet die or the like, laminating the matrix resin sheet and a previously manufactured carbon fiber woven cloth, which is coated with amorphous carbon, and compressing the laminate while heating. After that, a sheet-like carbon fiber composite material can easily be obtained by cooling.

A ratio between carbon fibers and a matrix resin for use can be considered as a mass ratio of fibers in a composite. A preferable mass ratio depends on the form of carbon fibers to be used, and for example, when a carbon fiber cloth is used, a mass ratio of fibers is preferably within a range of 40 to 60%.

Plate-like carbon fiber composite materials having optional thicknesses can also be obtained by heating and compressing laminates, in which desired numbers of the sheet-like carbon fiber composite material described above are laminated.

Further, by arranging a shape of a die at the time of compression, shaping becomes possible.

EXAMPLES

<Nuclear Magnetic Resonance Spectrum (NMR Spectrum)>

Varian Inova 1H-NMR (600 MHz) manufactured by Agilent Technologies, Inc. was used. Deuterated dimethyl sulfoxide was used for measurements, and the number of spectral integration was 256, relaxation time was 10 seconds.

<Raman Spectrum>

The equipment used was InviaRaman Microscope, manufactured by RENISHAW Plc. Laser light of 530 nm was selected.

<Tensile Test Device>

Test machine: Autograph AB-10 TB, manufactured by SHIMADZU Corporation.

Tensile speed: 5 mm/minutes.

Excised with a width of 10 mm, and performed with a span of 50 mm.

<Observation of Fracture Surface>

Observations were performed by using Eclipse L200, manufactured by Nikon Corporation. Images were photographed by using Coolpix®, manufactured by Nikon Corporation).

Example 1

Chemical Analysis

As raw materials, 0.16 g (1 mmole) of 1,5-dihydroxynaphthalene (Wako Pure Chemical Industries, Ltd Cat. No. 048-02342), 0.08 g (1 mmole) of 40% methylamine aqueous solution (Wako Pure Chemical Industries, Ltd., Cat. No. 132-01857), and 0.16 g (2 mmoles) of 37% formaldehyde aqueous solution (Wako Pure Chemical Industries, Ltd. Cat. No. 064-00406) were added in this order to a 50 cc beaker containing 4.8 g of dimethyl sulfoxide-d6 (Wako Pure Chemical Industries, Ltd., Cat. No. 044-29086).

Then, a mix solution was prepared by stirring lightly with a glass rod to dissolve the raw materials. After the mix solution was left for 3 hours at a normal temperature, a portion of the mix solution was taken to obtain an NMR chart following the method described above. The NMR chart is shown in FIG. 2.

Figure 2:
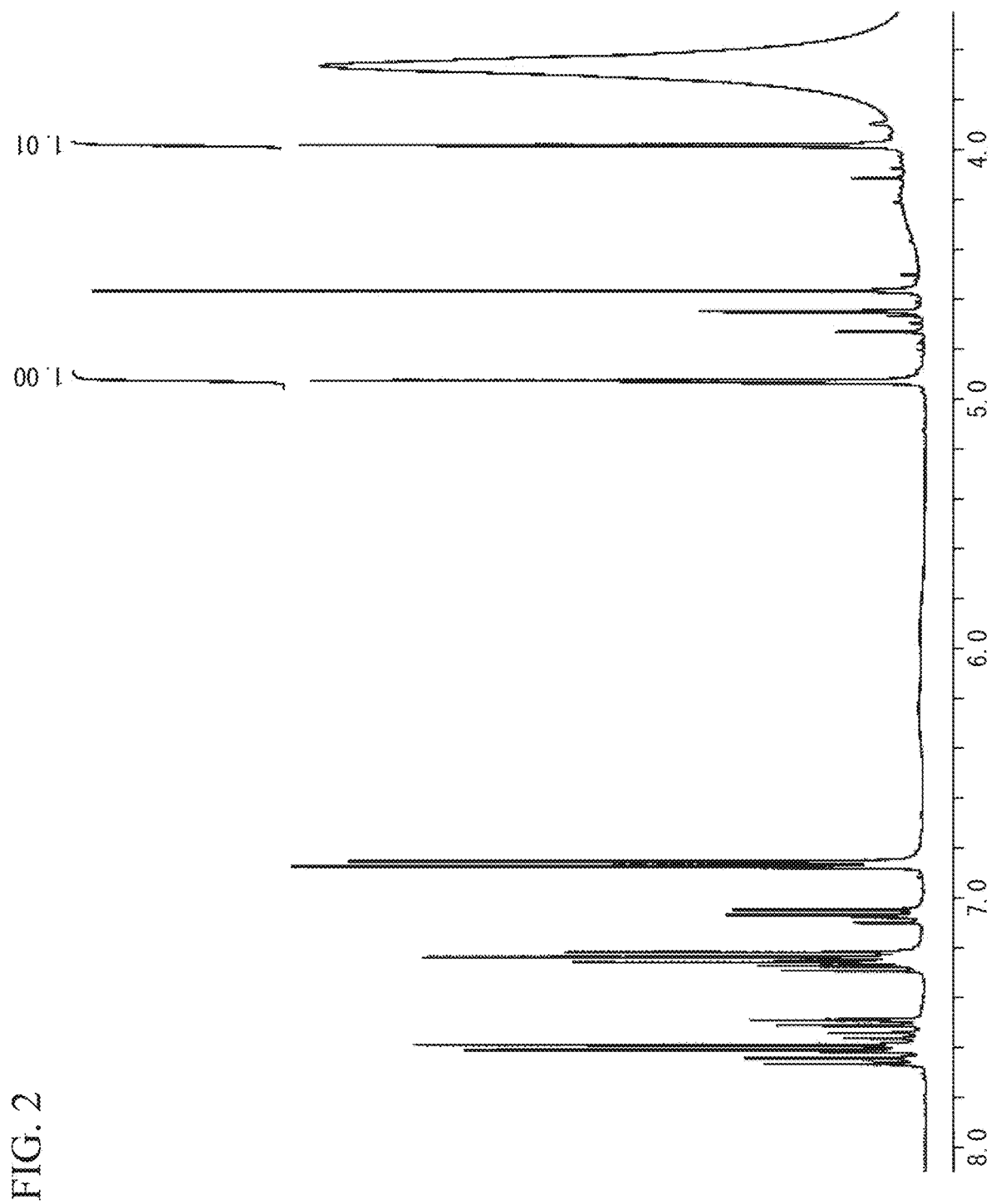
FIG. 2 shows an NMR chart of a naphthoxazine resin solution.

From the result of FIG. 2, it was confirmed that a methylene group of "benzene ring-$CH_2$—N" of a naphthoxazine ring was observed at 3.95 ppm, and a methylene group of "O—$CH_2$—N" was observed at 4.92 ppm, with almost equivalent strengths, and thus it can be concluded that a forming reaction of a naphthoxazine ring was sufficiently proceeded.

The solution was further left, and after 5 hours were passed, the solution was coated on a glass plate with a knife coater. The glass plate was placed on a hot plate whose temperature was set to 170° C. for 1 hour, and thereby drying and a carbonization treatment of the solvent were performed at the same time.

The Raman spectrum of a resin film formed on the glass plate in such a way was obtained following the method described above. The Raman spectrum is shown in FIG. 3.

Figure 3:
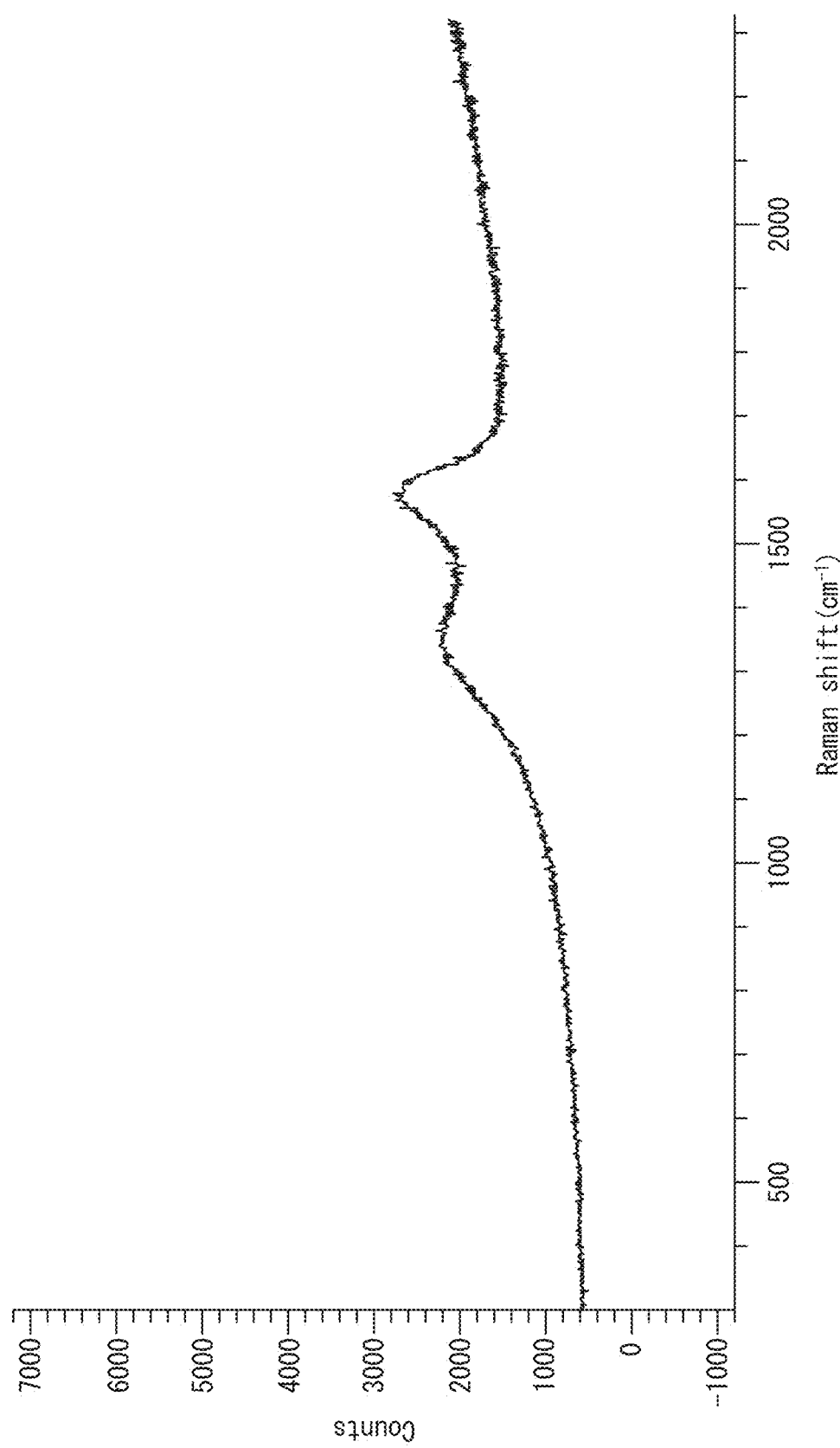
FIG. 3 shows a Raman spectrograph of a carbonized naphthoxazine resin.

In the Raman spectrum of FIG. 3, the G and D bands can be clearly observed. Since any other peaks are not observed, it can be confirmed that the naphthoxazine resin was changed to amorphous carbon.

Example 2

Production of Carbon Fiber Composite Material

As a solvent, 20 g of dimethylformamide (Wako Pure Chemical Industries, Ltd., Cat. No. 045-02916); and as raw materials, 1.6 g of 1,5-dihydroxynaphthalene (Wako Pure Chemical Industries, Ltd., Cat. No. 048-02342), 0.8 g of 40% methylamine aqueous solution (Wako Pure Chemical Industries, Ltd., Cat. No. 132-01857), and 1.6 g of 37% formaldehyde aqueous solution (Wako Pure Chemical Industries, Ltd., Cat. No. 064-00406) were added in this order to a beaker, and were stirred to prepare a solution.

This solution was heated in a water bath of 100° C. for 10 minutes while stirring to produce a naphthoxazine resin solution.

A carbon fiber woven cloth (TORAYCA cloth CO634313, NISSEI Limited) was impregnated with the above-described solution. After the carbon fiber woven cloth was taken out, it was pinched between gum rollers to remove the excess resin solution, and then was dried at a normal temperature for 5 hours while hanging to remove the solvent. After that, the carbon fiber woven cloth was placed in a heating oven set to 170° C. for 30 minutes, and thereby a naphthoxazine resin on a surface was carbonized.

The injection molding grade polypropylene (MFR=10, Cat. No. MA3H, Japan Polypropylene Corporation) was shaped in a sheet-like form having a thickness of about 160 μm by using a hot press. This sheet was laminated onto the carbon fiber woven cloth which was given the aforementioned surface treatment, and the laminate was compressed with a hot plate heated to 200° C. to impregnate the woven cloth with molten polypropylene (30 t press TOYO SEIKI Co., Ltd.). At this time, the press pressure was about 10 kgf/$cm^2$, and the press time was about 2 minutes. The carbon fiber woven cloth impregnated with the resin was cooled to produce a desired carbon fiber composite material, and the tensile strength properties thereof were measured by the method described above. The results of the tensile strength properties are shown in Table 1.

Figure 4:
FIG. 4 shows a photograph of a fracture surface of the carbon fiber composite material of Example 2, which was observed with a light microscope.

An appearance of the fracture surface after the tensile test was checked with a light microscope, and it was confirmed that, any carbon fibers were not pulled out from the resin, but firmly adhered to the resin. A photograph of the fracture surface of the carbon fiber composite material, which was checked with a light microscope is shown in FIG. 4.

Comparative Example 1

A sample was prepared in the same manner as in Example 2, except that a carbon fiber woven cloth (TORAYCA cloth CO6343B, NISSEI Limited) whose surface was not treated was used, and a test was performed. The results of the tensile strength properties are shown in Table 1.

Figure 5:
FIG. 5 shows a photograph of a fracture surface of the carbon fiber composite material of Comparative Example 1, which was observed with a light microscope.

An appearance of the fracture surface after the tensile test was checked with a light microscope, and it was confirmed that, many carbon fibers were pulled out from the resin, and not sufficiently adhered to the resin. A photograph of the fracture surface of the carbon fiber composite material, which was checked with a light microscope is shown in FIG. 5.

Comparative Example 2

A prepreg (TORAYCA prepreg F6343B, NISSEI Limited), which was previously impregnated with an epoxy resin, was compressed with a hot plate heated to 130° C. (30 t press, TOYO SEIKI Co., Ltd.) to polymerize the uncured epoxy resin with which the prepreg was impregnated, and thus a carbon fiber composite material was prepared. At this time, the press pressure was about 1 kgf/cm$^2$, and the press time was 1 hour. The results of the tensile strength properties are shown in Table 1.

TABLE 1

| Tensile direction | | Modulus of tensile elasticity (GPa) | Maximum point stress (MPa) | Break point distortion (%) |
|---|---|---|---|---|
| Fiber direction | Comparative Example 2 | 9.55 | 71.4 | 0.79 |
| | Comparative Example 1 | 8.53 | 104 | 2.06 |
| | Example 2 | 12.8 | 130.6 | 1.67 |
| 45° direction | Comparative Example 2 | 4.69 | 47.2 | 2.38 |
| | Comparative Example 1 | 0.79 | 38.9 | 37.3 |
| | Example 1 | 3.55 | 29 | 13.08 |

To compare physical properties of composites, evaluations are preferably made for values obtained in fiber directions. In Example 2, values of both modulus of elasticity and maximum point stress were higher than those in Comparative Example 1, which was not subjected to the surface treatment, and these values were also higher than those in Comparative Example 2, in which a thermoset resin was used as a matrix resin.

As a reference, values of tensile properties were obtained also in a direction deviated in 45° from the fiber direction. Although the value of modulus of elasticity was not as good as that in Comparative Example 2, in which a thermoset resin was used as a matrix resin, the value was largely improved over that of Comparative Example 1, which was untreated, and thus it can be concluded that strong adhesion to carbon fibers were made.

INDUSTRIAL APPLICABILITY

The carbon fiber composite material of the present invention has good adhesiveness between a matrix resin and carbon fibers, which results in high-strength, even if a matrix resin having difficulties on adhesion is used, and thus it can be preferably used in, for example, wings for wind power generation and the like.

The invention claimed is:

1. A method for producing a carbon fiber composite material comprising carbon fibers coated with amorphous carbon, and a matrix resin, the method comprising:
   impregnating carbon fibers with a solution comprising a phenol resin;
   carbonizing the phenol resin at 200° C. or below to obtain carbon fibers coated with amorphous carbon; and
   impregnating the carbon fibers coated with amorphous carbon with the matrix resin,
   wherein the impregnating the carbon fibers coated with amorphous carbon with the matrix resin comprises laminating a film comprising the matrix resin and the carbon fibers coated with amorphous carbon to obtain a laminate, and compressing the laminate while heating.

2. The method according to claim 1, wherein the phenol resin is a naphthoxazine resin.

3. The method according to claim 2, wherein the naphthoxazine resin is derived from aliphatic amines.

4. The method according to claim 1, wherein the matrix resin is polypropylene.

5. The method according to claim 1, wherein the carbon fibers are continuous carbon fiber woven cloth.

6. The method according to claim 1, wherein the solution comprising the phenol resin is obtained by heating a solution comprising phenolic monomers to room temperature or higher.

7. The method according to claim 1, wherein the matrix resin consists of a thermoplastic resin.

* * * * *